United States Patent

Faulds

[15] 3,643,770
[45] Feb. 22, 1972

[54] OVERLOAD TORQUE CLUTCH

[72] Inventor: William W. Faulds, R.R. 3, St. Catharines, Ontario, Canada

[22] Filed: Nov. 16, 1970

[21] Appl. No.: 89,684

[52] U.S. Cl. ............................................192/56 R, 192/71
[51] Int. Cl. ....................................F16d 11/06, F16d 43/20
[58] Field of Search....................................192/56 R, 150, 71

[56] References Cited

UNITED STATES PATENTS

| 716,857 | 12/1902 | Bolvin | 192/56 R |
| 1,745,738 | 2/1930 | Carter, Jr. | 192/56 R |
| 2,376,925 | 5/1945 | Lavin | 192/56 R |

FOREIGN PATENTS OR APPLICATIONS

| 1,350,808 | 12/1963 | France | 192/56 R |

*Primary Examiner*—Allan D. Herrmann
*Attorney*—Weir, Marshall, MacRae & Lamb

[57] ABSTRACT

An overload torque clutch in which a pair of slidable fingers on a driving member engage rigidly mounted stops on a coaxially mounted driven member. The slidable fingers are held in the engaged position by a transverse resiliently loaded yoke member which locates in specially designed recesses in the fingers. At a predetermined torque level of the fingers are forced out of contact with the stops and the yoke rides out of the recesses against the action of the resilient loading. The clutch may be reset manually, hydraulically or pneumatically. The device is particularly useful as a safety clutch to disengage heavy-duty equipment, such as conveyor belt systems, from an electric drive in the event of jamming or the like.

7 Claims, 6 Drawing Figures

PATENTED FEB 22 1972

INVENTOR
William W. Faulds
BY Weir, Marshall,
MacRae & Lamb
PATENT AGENT

OVERLOAD TORQUE CLUTCH

This invention relates to an overload torque clutch, particularly for use with electric motor driven devices, such as conveyor belt systems and heavy-duty equipment, whereby drive to the belt may be disengaged quickly and efficiently when torque in excess of a predetermined value is applied. The device is particularly useful where torque loads in excess of about 9,000 ft./lb. are encountered.

Previously known torque limiting clutches have various undesirable characteristics. A fault commonly found is that the limiting torque which is intended to cause tripping is variable either because of varying degrees of frictional resistance which must be overcome before tripping can be effected, or because the resilient member which is responsive to the applied torque is erratic. Another common fault is that existing clutches are subject to wear at critical point such that tripping occurs at erratic applied torque levels. Another fault which is common is that the torque transmitting element or the torque responsive element is subject to breakage upon the sudden application of a torque substantially greater than the intended maximum torque so that extremely heavy equipment is required and such equipment is cumbersome to operate, build, maintain and above all to reset after a stoppage. It is, therefore, one object of the present invention to provide an overload torque clutch which can be used in heavy-duty applications and which at least substantially overcomes the disadvantages of the clutches of the prior art.

It is another object of the invention to provide a simple overload torque clutch which can be rapidly reset following application of an overload torque by manual, hydraulic or pneumatic means.

It is yet another object to provide an overload torque clutch in which a simple sleeve bearing suffices between the coaxially aligned driving member and driven member because relative movement between said members only occurs in a no-load condition.

In order to achieve the objects of the invention there is provided, by one aspect of the invention, rotary coaxially aligned driving and driven members which are releasably interconnected by a pair of stop members rigidly mounted on said driven member and a pair of finger members slidably mounted on said driving member. The finger members are held in an extended position in which they contact said stop members, by means of a spring loaded yoke member located in a shaped transverse groove adjacent the end of said finger members remote from said stop members. The yoke member is held in the groove by the action of a resilient means such as a spring acting perpendicular to the movement of the finger members. When an overload torque is applied, the finger members are forced inwardly from the interconnecting position in contact with the stop members, and at the same time the yoke member is forced out of the shaped groove against the action of the spring so that the yoke fingers ride up onto the main body of the fingers, into a disengaged or safe position. To reset the clutch the fingers are manually hydraulically or pneumatically forced outwardly to reengage with the stop members and the yoke fingers ride back into the grooves under the action of the spring.

The invention will be more fully understood and the advantages thereof more apparent when considered in the light of the following detailed description and the drawings in which.

Figure 1:
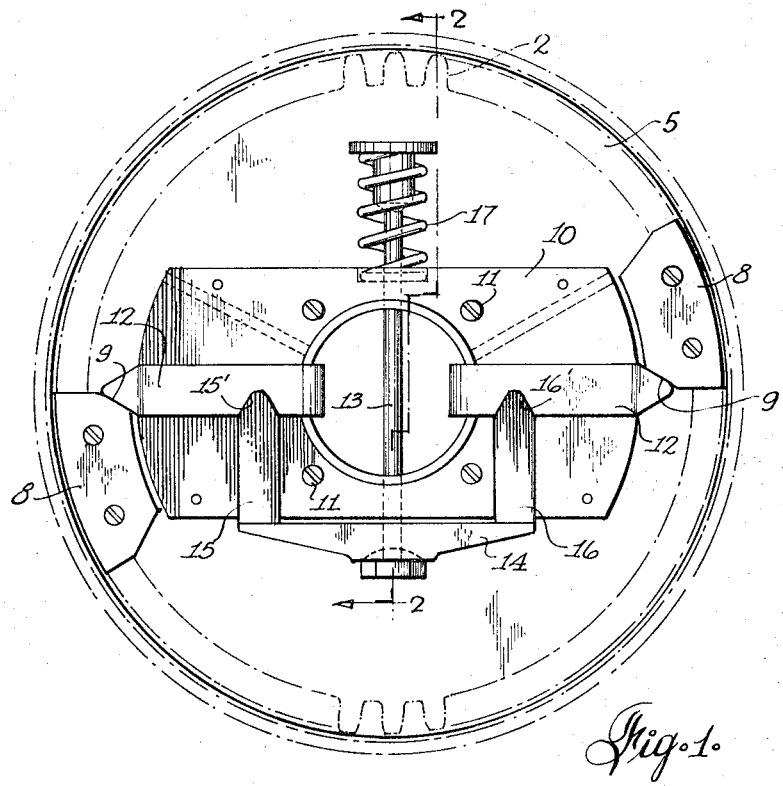
FIG. 1 is a plan view of one embodiment of the clutch of the present invention, with the cover removed, and with the clutch in engaged position.

Turning first to the embodiment shown in FIGS. 1–4, there is provided an overload torque clutch in conjunction with a drive shaft 1 and a driven sprocket toothed or gear toothed ring 2. A driving member 3 is secured to the drive shaft 1 by a key or other suitable device such as set screw 4. Driven ring 2 is secured to a circular driven member 5 by securing screws 6 and coaxially mounted over driving member 3 with a bushing or sleeve bearing 7 therebetween. Driven member 5 is provided with at least two stop blocks 8 mounted diametrically opposite each other on the periphery thereof. Blocks 8 are provided with angled contact surfaces 9, for a purpose described hereinafter. A yoke and slide housing 10 is rigidly mounted on driving member 3 as by screws 11. Housing 10 is provided with a pair of opposed slide channels in which finger slides 12 may be advanced and retracted. Slides 12 as provided with angled ends having an included angle of about 50°–60 which mate with the angled contact faces 9 of blocks 8. A spring loaded pin 13 is also mounted in housing 10, transverse to slides 12 and carrying a yoke 14. Yoke 14 is provided with two arms 15 and 16 having V-shaped ends and adapted to move in housing 10 transverse to the movement of slides 12. Yoke 14 may flex somewhat on pin 13 and along the length so that binding may be eliminated. The V-shaped ends of arms 15 and 16 are adapted to fit in V-shaped recesses 15' and 16' in slides 12 when the slides 12 are in an extended position in which the V-shaped ends thereof may contact the sloping contact faces 9 of blocks 8. Arms 15 and 16 are held in the recesses 15' and 16' by the pressure of compression spring 17 exerted on the yoke 14 via pin 13.

Figure 3:
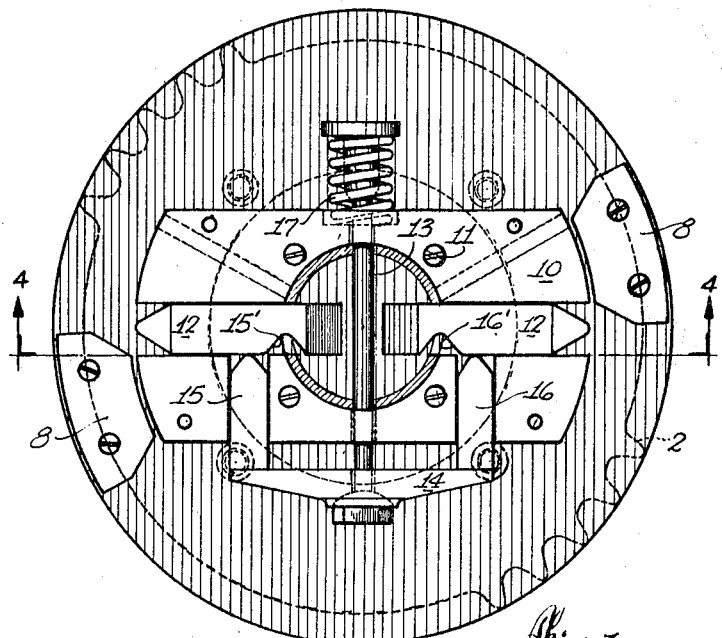
FIG. 3 is a similar view of the clutch of FIG. 1 shown in disengaged position.

In operation, should an overload torque be applied as by a stoppage or jam on the conveyor belt driven by gear or chain sprocket wheel 2, the V-shaped ends of slides 12 are caused to ride down the sloping contact faces 9 towards the retracted position as shown in FIG. 3. As slides 12 retract, the V-shaped ends of arms 15 and 16 are forced out of recesses 15' and 16', against the pressure of spring 17, so that in the position shown in FIG. 3 the clutch is disengaged and the driving member 3 rotates under no-load conditions relative to driven member 5. It will be appreciated that the overload torque at which the clutch disengages is a matter of design convenience and can be varied over a wide range by adjustment of the angles on the contact faces of the slides 12 and yoke arms 15 and 16, and by adjustment of compression spring 17. Normally the angle of contact face 9 of block 8 corresponds to that of the contact faces of slides 12 which have an included angle of between 50° and 60°, and the angle of the recesses 16' is somewhat greater so that arms 15 and 16 ride out of recesses 16' without difficulty. As arms 15 and 16 ride out of the recesses 16' a considerable area of contact remains at the pressure contact face 9 of block 8 and slides 12 so that when the tips of arms 15 and 16 reach the flat surface of the slides, the slides continue their inward movement to disengage from blocks 8 without risk of breakage of the tips of slides 12. Obviously, should arms 16 and 15 jam in recesses 15' and 16', slides 12 would be distorted or broken by excess pressure on faces 9 of blocks 8.

Figure 2:
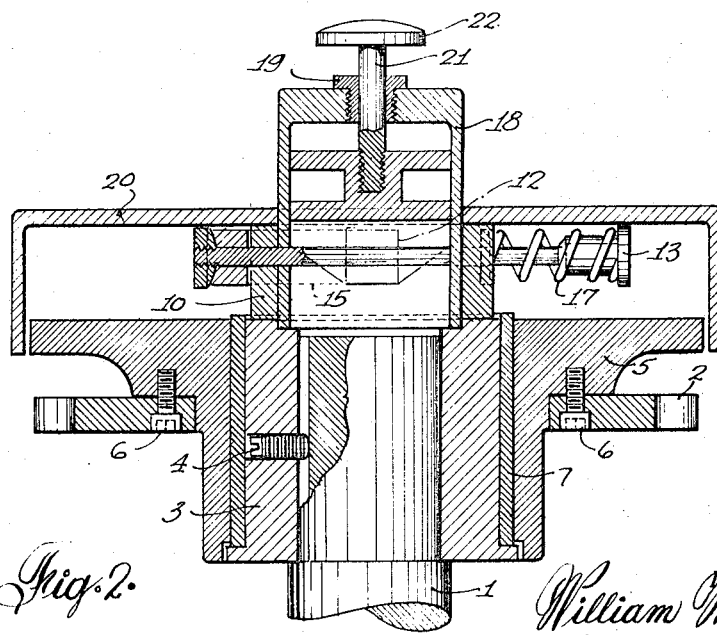
FIG. 2 is a section along line 2—2 of FIG. 1, showing the cover in place.
Figure 4:
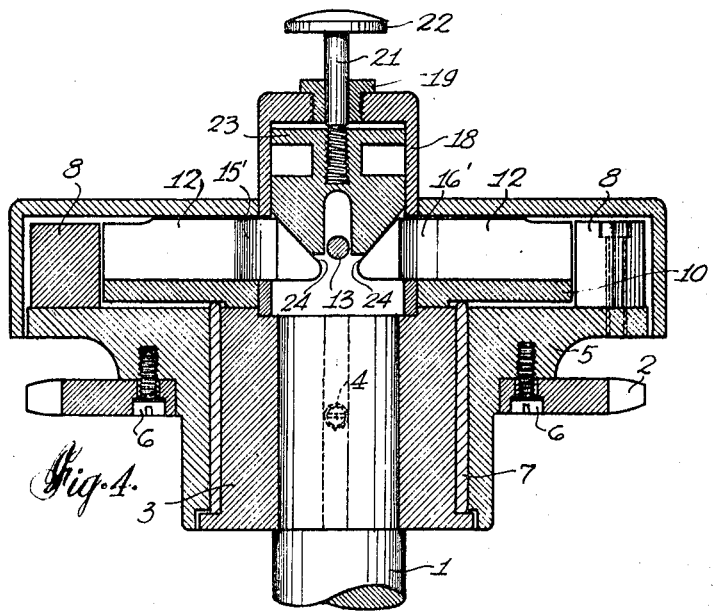
FIG. 4 is a section along line 4—4 of FIG. 3, showing the clutch cover.
Figure 6:
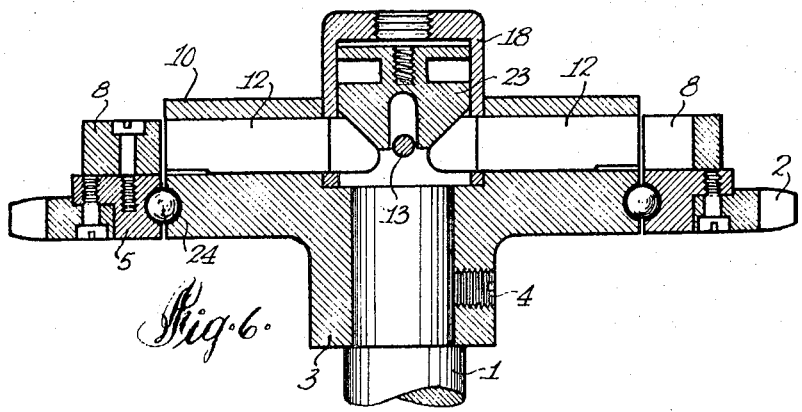
FIG. 6 is a section along line 6—6 of FIG. 5 showing the housing and reset device.

Resetting of the clutch can be effected in several ways, one of which is shown in FIGS. 2, 4, and 6. FIG. 4, for example, shows a cover 18 over the center of the clutch provided with a bushing 19 for a plunger 21. Plunger 21 is provided with a hand button 22 and a wedge 23, which wedge cooperates with similarly shaped ends 24 of slides 12 so that an operator merely pushes button 22 inwardly to effect extension of slides 12 into cooperation with stop members 8. If desired, plunger 21 may be resiliently loaded to ensure retraction of wedge 23 out of contact with ends 24 following reset, although this is not essential as plunger 21 and wedge 23 are free to float out of contact. As an alternative to the manual reset a pneumatic or hydraulic reset may be employed in which plunger 21 and button 22 are replaced by an air line which is screwed into bushing 19 so that cover 18 acts as a hydraulic or pneumatic cylinder in which wedge 23 is a floating piston. In a further alternative embodiment the clutch could be electrically operated by a solenoid to actuate hand button 22.

Figure 5:
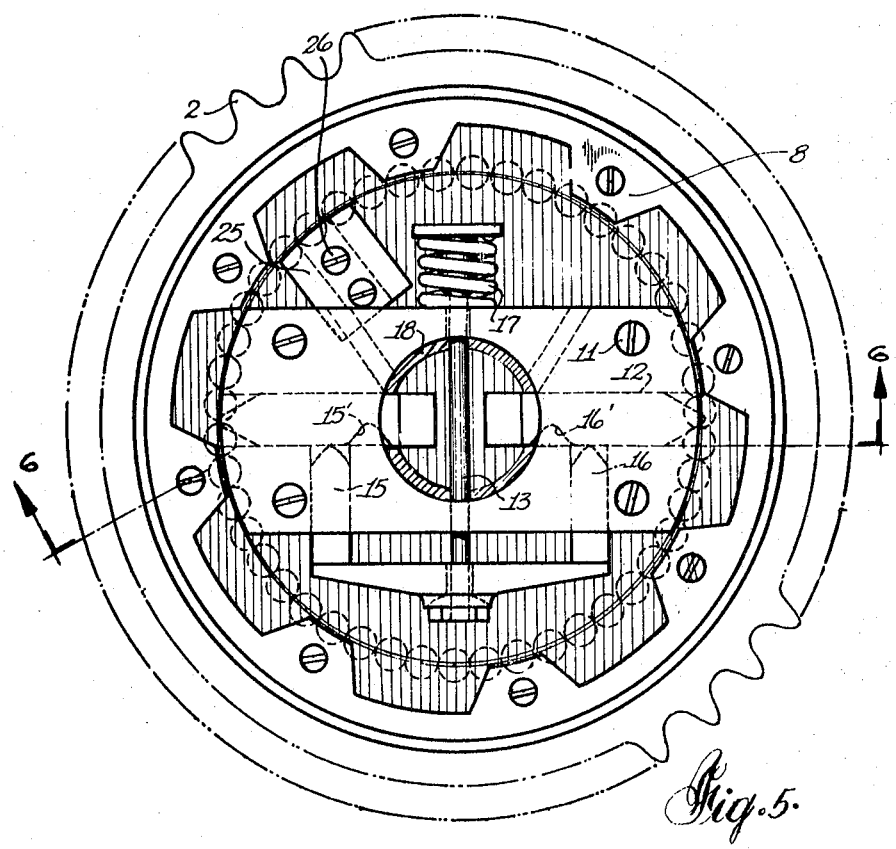
FIG. 5 is a plan view of an alternative embodiment of the clutch, shown in disengaged position.

It will be appreciated by those skilled in the art that numerous alternative embodiments of the invention may be produced, without departing from the invention and the novel characteristics of the yoke and slide arrangement described hereinbefore. For example, the clutch of the present arrangement may be employed with a chain drive, with a chain drive sprocket or may be employed in a geared drive device depending upon the driven member chosen. It will also be appreciated that the clutch of the present invention may be operated equally well in both forward and reverse rotation without modification thereto. Alternative reset devices as herein described may be employed as specific circumstances require. In the embodiment illustrated in FIGS. 1–4, a relatively deep clutch is described which is provided with a clutch cover 20 which is particularly suitable in dusty or dirty environments. In other environments or situations, the cover 20 may be omitted without departing from the essential novelty of the present invention. In yet other circumstances, a clutch such as that shown in FIGS. 1–4 may be impractical by reason of the space available, and in such cases resort may be had to the thinner uncovered embodiment illustrated in FIGS. 5 and 6. In FIGS. 5 and 6 the driving member 3, block 10, slides 12 and yoke 14 are precisely similar to the parts of like numbers in FIGS. 1–4, and operate in similar manner. Driven member 5, is however, rotatably mounted around the periphery of driving member 3 on a ball race 24 such that the total depth of the clutch is considerably reduced as illustrated in FIG. 6. A sprocket wheel 2 and stop members 8 are secured to the driven member as before and the clutch functions as described with reference to FIGS. 1–4. FIG. 6 shows a cover 18 adapted to receive a bushing for a pneumatic reset device although it will be appreciated that the same cover may be adapted to receive a manual reset mechanism which operates in the same manner as that described with reference to FIG. 4.

An additional modification is illustrated in FIG. 5 inasmuch as a plurality of pairs of stop members 8 are shown in distinction to FIGS. 1 to 3 where only a single pair of members 8 are shown. A plurality of pairs of members 8 permits smoother engagement and less "lost motion" before engagement and is to be preferred in heavy load situations. In the embodiment shown in FIGS. 5 and 6, the ball race 24 includes a large number of relatively small diameter balls, but it will be appreciated that the number and diameter of the balls is not critical and may be varied within wide limits depending upon the particular design situation. It will also be noted that driving member 3 is provided with a peripheral cover plate 25, secured by screws 26, which may be removed to facilitate insertion of the ball bearings into ball race 24.

In a further alternative embodiment the clutch of the present invention may be air assisted. When employed, preferably with a pneumatic reset, the torque releasing point may be set at a lower torque level than is required to drive the load, but with sufficient tension on spring 17 to hold the clutch in the safe or disengaged position shown in FIGS. 3 and 5. A regulated air pressure may be applied to the clutch reset system, and maintained at intervals, to force piston 23 inwards thus forcing slides 12 outwardly into engagement with stops 8. When the air pressure is removed the clutch will release or disengage. Thus the clutch can be controlled by regulating the air pressure so as to provide a "stop and start" clutch with an overload protection device.

In yet another alternative mode of operation, particularly useful in situations where the initial startup torque exceeds the desired overload torque release point, an operator can assist the clutch by applying pneumatic pressure to the reset at startup thereby preventing the clutch disengaging at the preset level while still permitting release at a higher torque in the event of a jam. The actual release point is, of course, governed by the pneumatic pressure. Once the equipment is functioning under normal load conditions, the operator can release the pneumatic assist and the clutch then remains in engagement as described herein before.

I claim:

1. An overload torque clutch comprising: a rotatable driving member; a rotatable driven member coaxially mounted with said driving member; at least two stop members rigidly mounted on said driven member in diametrically opposed relationship; a pair of slide members slidably mounted on said driving member for slidingly releasable engagement with said stop members; a yoke member having a pair of dependent arms resiliently mounted on said driving member transverse to said slide members, each of said arms being adapted to releasably engage a recess formed in a respective one of said slide members whereby said slide members are held in releasable engagement with said stop members; and means mounted on said driving member to extend said slide members into engagement with said stop members.

2. An overload torque clutch as claimed in claim 1, wherein each of said slide members is provided with a V-shaped end having an included angle of between 50° and 60° and said stop members are provided with contact faces having angles complementary to said V-shaped ends.

3. An overload torque clutch as claimed in claim 2 wherein each of said arms is provided with a V-shaped end which releasably engages in a correspondingly shaped recess provided in a respective said slide member at a position remote from said V-shaped end thereof.

4. An overload torque clutch as claimed in claim 1 wherein said means to extend said slide members comprises a pneumatic means.

5. An overload torque clutch as claimed in claim 1 wherein said means to extend said slide members comprises a manually operated reset means.

6. An overload torque clutch as claimed in claim 1 including a cover member mounted on said driving member and on which cover member said means to extend said slide members is secured.

7. An overload torque clutch as claimed in claim 1 wherein said yoke member is provided with a resilient spring means whereby said arms are maintained in releasable engagement with said recesses.

* * * * *